_United States Patent Office_

3,772,445
Patented Nov. 13, 1973

3,772,445
GERMICIDAL AND FUNGICIDAL AGENT
AND USE THEREOF
Teruhisa Noguchi and Yoshinobu Hashimoto, Fujisawa, Yoshio Uchiyama, Takaoka, and Michio Ueyama, Tokyo, Japan, assignors to Nippon Soda Co., Ltd., Tokyo, Japan
No Drawing. Filed Nov. 23, 1970, Ser. No. 92,151
Claims priority, application Japan, Dec. 1, 1969,
44/95,747
Int. Cl. A01n 9/20
U.S. Cl. 424—340         1 Claim

ABSTRACT OF THE DISCLOSURE

A germicidal and fungicidal agent which is composed of a specific novel diphenyl ether compound represented by a following general formula.

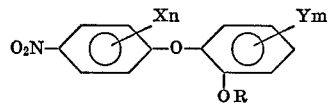

which is characterized by excellent germicidal and fungicidal activity and less toxicity. The compound can be used for ingredient of a sterilizing agent, an antiseptic detergent composition, a slime control agent and a fungus inhibitor for plastics.

DETAILED EXPLANATION OF THE INVENTION

This invention relates to a germicidal and fungicidal agent, more particularly relates to a germicidal and fungicidal agent containing specific diphenyl ether compounds and further this invention concerns with a method controlling germs and fungi.

The increasing use in recent decades of various antibiotics has been countered in nature by the emergence of antibiotic resistant strains of bacteria and unexpected harmful effects come from contamination of food or drinks. Consequently, there is an increased need for a chemical compound which has a sufficient action for killing germs and fungi. However, some of the ingredients being used for the above purpose, on the one hand, have an excellent effect but, on the other hand, harm human skin or eyes. On the contrary, those which have less toxicity, do not provide satisfactory germicidal and fungicidal activity.

Thus, it is an object of this invention to provide a germicidal and fungicidal agent which has an excellent activity and non-toxicity. It is a further object of the invention to provide a method of controlling germs and fungi. Another object of this invention is to provide toilet materials having excellent germicidal properties, which contains the agent aforementioned. A further object of the invention is to provide an additive for plastics which prevents the growth of germs or fungi. Yet an additional object of the invention is to provide a slime controlling agent for use in paper manufacturing. Other objects and advantages will be more apparent from the following detailed description.

Briefly stated, the present invention is based upon the discovery that the new diphenyl ether compound represented by the following general Formula 1 has excellent germicidal and fungicidal activities without any human and mammalian toxicity;

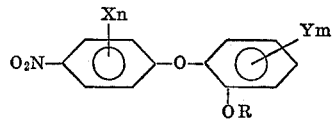

wherein X is selected from the group consisting of halogen atom, hydroxy and lower alkyl group; Y is halogen atom or atoms and when m is a plural number, Y may consist of different kind of halogen atoms; R is selected from the group consisting of a hydrogen atom, sodium atom, zinc atom (½ Zn), aliphatic acyl,

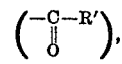

substituted or non-substituted aromatic acyl

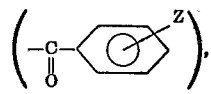

alkoxy carbonylmethyl (—CH$_2$COOR″), hydroxycarbonylmethyl, (—CH$_2$COOH), alkali metal salt of hydroxycarbonylmethyl (—CH$_2$COOM), tosyl

chloromethanesulfonyl (—SO$_2$CH$_2$Cl), dihydroxyphosphinyl (—PO(OH)$_2$) alkali metal salt of dihydroxyphosphinyl (—PO(OM)$_2$, dialkoxyphosphinyl (—PO(OR‴)$_2$) dialkoxythiophosphinyl (—PS(OR‴)$_2$) and alkylcarbamoyl (—CONHR″″); n expresses 0 or 1, m expresses 0 or integer of not more than 3 and exclude the case either m and n are 0.

The term of alkyl means an alkyl group having less than 4 carbon atoms and the methyl radical is particularly preferable. Of the halogen atoms represented by the symbol Y, chlorine atom is most preferable. Z expresses hydrogen, a halogen or a methyl group.

Although various kind of compounds had been proposed as a germicide or a fungicide, we have to emphasize that the compound of the present invention is characterized by furnishing both excellent activity and extremely low toxicity.

The compounds represented in the general Formula I can be prepared in accordance with one of the processes presented by the following chemical equations.
(i) when R=CH$_3$, X=lower alkyl group or hydrogen atom

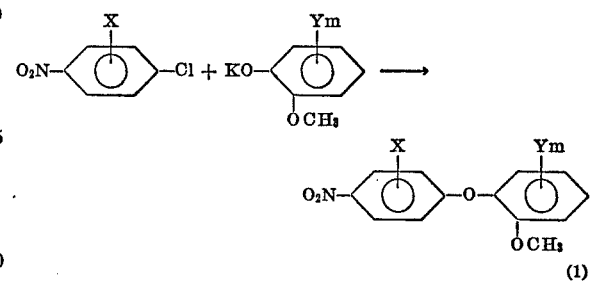

(ii) when X=Y=halogen atom

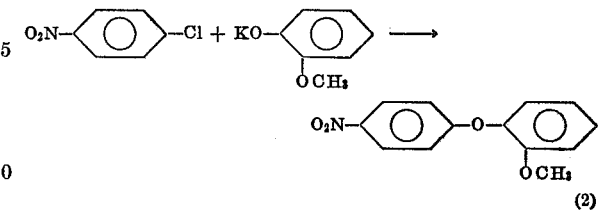

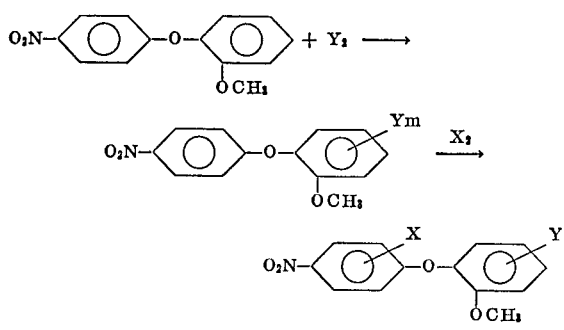

(iii) when X=—OH and R=H

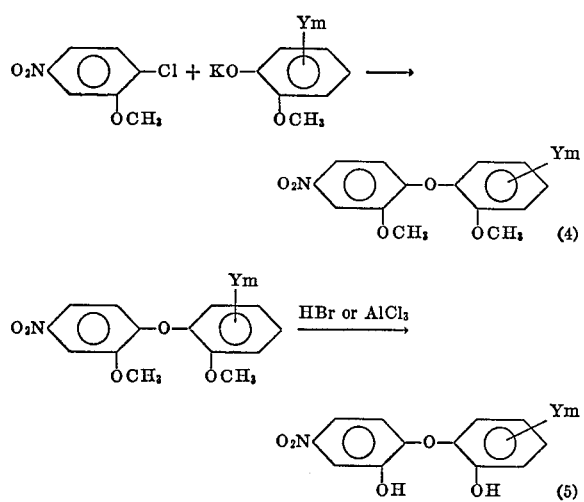

(iv) when R=H

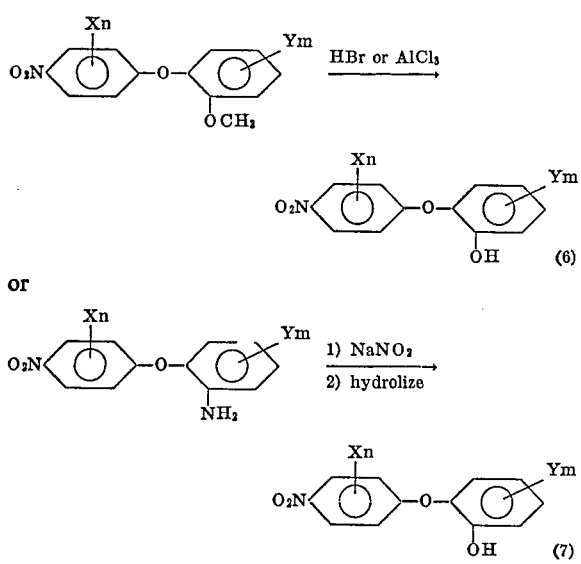

(v) when R is a substituting group

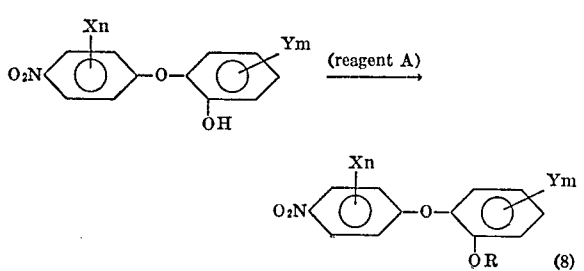

Reagent A is determined by the species of the substituting group and reagent examples are illustrated in Table 1.

TABLE 1

| No. | Substituting group | Reagent A |
|---|---|---|
| 1 | Na | NaOH |
| 2 | ½ Zn | NaOH, ZnCl$_2$ |
| 3 | —COR' | O(COR')$_2$ or ClCOR' |
| 4 | —CO—⌬—Z | ClCO—⌬—Z |
| 5 | —CH$_2$COOR'' | ClCH$_2$COOR'' or ClCH$_2$COOH and R''OH |
| 6 | —CH$_2$COOH | ClCH$_2$COOH |
| 7 | —SO$_2$—⌬—CH$_3$ | ClOS$_2$—⌬—CH$_3$ |
| 8 | —SO$_2$CH$_2$Cl | ClSO$_2$CH$_2$Cl |
| 9 | —PO(OR''')$_2$ | ClPO(OR''')$_2$ |
| 10 | —PS(OR''')$_2$ | ClPS(OR''')$_2$ |
| 11 | —PO(OH)$_2$ | POCl$_3$ |
| 12 | —CONHR'''' | R''''NCO |

The reaction illustrated in the Equations 1, 2 and 4 can be carried out by reacting substituted or non-substituted p-nitro chlorobenzene with potassium salt of guaiacol under the presence of a polar solvent such as acetone, acetic acid, dimethyl formamide and dimethyl sulfoixde. The halogenation reaction in the Equation 3 can be easily performed by conventional process. The demethylation reaction illustrated in the Equations 5 and 6 may be performed by heating 2-methoxy-4'-nitrodiphenyl ethers provided by the method of Equation 1 or 4 with hydrobromic acid or its mixture with acetic acid. Another method for demethylation consists of heating 2-methoxy-4'-nitrodiphenyl ethers together with aluminum chloride in benzene. The reaction in the Equation 7 can be carried out by diazotizing the corresponding 2-amino-4'-nitrodiphenyl ethers and successively hydrolyzing the resulting diazonium salt with aqueous acid.

The compounds having an alkali metal atom in the position of symbol R (Table 1, No. 1) can be prepared by treating 2-hydroxy-4'-nitro diphenyl ethers with caustic alkali or alkali metal alkolate. The compounds having a light metal atom in the position of symbol R (No. 2) can be obtained by reacting the above 2-sodium oxy-4'-nitrodiphenyl ethers with a chloride of light metal. Typical example of the chloride of light metal is zinc chloride. The compounds having substituting groups represented by Nos. 3, 4, 5, 6, 9 and 10 in Table 1 can be provided by reacting 2-hydroxy-4'-nitrodiphenyl ethers with chlorides or anhydride shown in Reagent A of Table I. The reaction may be favorably carried out in an organic solvent such as benzene but when the reagent is acid anhydride, the solvent is not essential. The reaction temperature is room temperature and the boiling point of the solvent or the reagent.

The compounds having substituting groups represented by No. 7 and No. 8 of Table 1 in the position of symbol R can be provided by reacting 2-hydroxy-4'-nitrodiphenyl ethers with corresponding sulfonylchlorides in the presence of benzene, acetone, alcohol or ether at the temperature of between 10° C. and boiling point of the employed organic solvent for 0.5–10 hrs.

The compounds having dihydroxyphosphenyl group in the position of symbol R can be provided by such method that 2-hydroxy-4'-nitrodiphenyl ether is made to react with phosphorus oxychloride in the presence of a small amount of sodium chloride for 1–20 hrs. and, after removing the unreacted phosphorus oxychloride, the residual mixture is hydrolyzed by water or aqueous caustic alkali.

Further, the compound having carbamyl group can be provided by the reaction between 2-hydroxy-4'-nitro diphenyl ethers and alkylisocyanate.

Typical diphenyl ether compounds of the present invention are illustrated in Table 2.

TABLE 2

| No. | Structural formula | Chemical name | Melting point or refractive index |
|---|---|---|---|
| I | 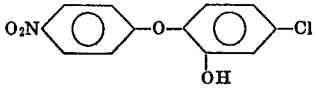 | 4-chloro-2-hydroxy-4'-nitro-diphenylether | M.P. 121~122.5. |
| II | 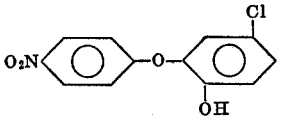 | 5-chloro-2-hydroxy-4'-nitrodiphenyl ether | M.P. 94~94.5. |
| III | 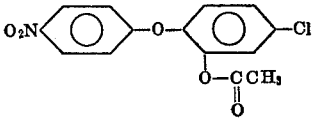 | 2-acetoxy-4-chloro-4'-nitrodiphenyl ether | M.P. 85~87.5. |
| IV | 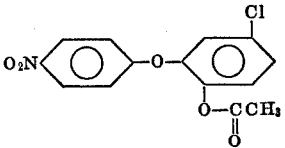 | 2-acetoxy-5-chloro-4'-nitrodiphenyl ether | M.P. 62~63. |
| V | 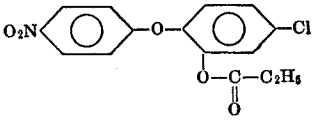 | 4-chloro-4'-nitro-2-propionoyloxydiphenyl ether | M.P. 75~77. |
| VI | 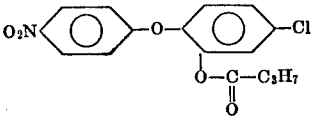 | 2-butyroyloxy-4-chloro-4'nitrodiphenyl ether | R.I. $n_D^{17}$-1.5790. |
| VII | 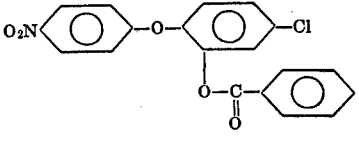 | 2-benzoyloxy-4-chloro-4'-nitrodiphenyl ether | M.P. 68~70. |
| VIII | 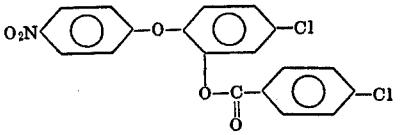 | 2-(p-chlorobenzoyloxy)-4-chloro-4'-nitrodiphenyl ether | M.P. 86~87. |
| IX | 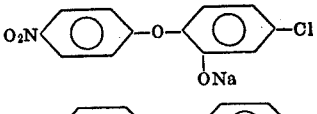 | Sodium 5-chloro-2-(4-nitrophenoxy)phenoxide | M.P. 120~123 (decompose). |
| X |  | Zinc 5-chloro-2-(4-nitrophenoxy)phenoxide | M.P. 162~165 (decompose). |
| XI | 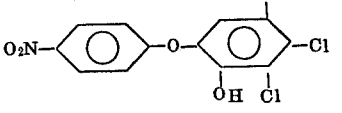 | 2-hydroxy-4'-nitro-3,4,5-trichlorodiphenyl ether | M.P. 147~149. |
| XII | 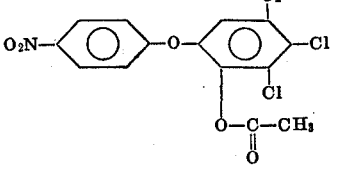 | 2-acetoxy-4'-nitro-3,4,5-trichlorodiphenyl ether | M.P. 92.5~95. |
| XIII | 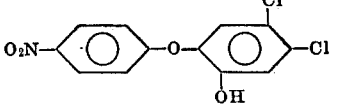 | 4,5-dichloro-2-hydroxy-4'-nitrodiphenyl ether | M.P. 123~124. |

TABLE 2—Continued

| No. | Structural formula | Chemical name | Melting point or refractive index |
|---|---|---|---|
| XIV | O₂N–⟨C₆H₄⟩–O–⟨C₆H₂(Cl)(Cl)⟩–O–C(=O)–CH₃ | 2-acetoxy-4,5-dichloro-4'-nitrodiphenyl ether | M.P. 83~84. |
| XV | O₂N–⟨C₆H₄⟩–O–⟨C₆H₃(Cl)⟩–O–CH₂–C(=O)–OCH₃ | Methyl 5-chloro-2-(4-nitrophenoxy)-phenoxyacetate | M.P. 74~78. |
| XVI | O₂N–⟨C₆H₄⟩–O–⟨C₆H₃(Cl)⟩–O–CH₂–C(=O)–OH | 4-chloro-2-(4-nitrophenoxy)-phenoxyacetic acid | M.P. 100~103. |
| XVII | O₂N–⟨C₆H₄⟩–O–⟨C₆H₃(Cl)⟩–O–CH₂C(=O)–OK | Potassium 5-chloro-2-(4-nitrophenoxy)phenoxyacetic acid. | M.P. 200 up. |
| XVIII | O₂N–⟨C₆H₄⟩–O–⟨C₆H₂(Cl)(Br)(OH)⟩ | 4-bromo-5-chloro-2-hydroxy-4'-nitrodiphenyl ether | M.P. 132.5~134.5. |
| XIX | O₂N–⟨C₆H₄⟩–O–⟨C₆H₂(Br)(Cl)(OH)⟩ | 5-bromo-4-chloro-2-hydroxy-4'-nitrodiphenyl ether | M.P. 136~138.5. |
| XX | O₂N–⟨C₆H₄⟩–O–⟨C₆H₃(Cl)⟩–O–P(=O)(OH)₂·4H₂O | 5-chloro-2-(4-nitrophenoxy)phenylphosphorate tetrahydrate. | M.P. 137~139. |
| XXI | O₂N–⟨C₆H₄⟩–O–⟨C₆H₃(Cl)⟩–O–P(=O)(ONa)₂ | Disodium 5-chloro-2-(4-nitrophenoxy)-phenyl phosphorate. | M.P. 141~142 (decompose). |
| XXII | O₂N–⟨C₆H₄⟩–O–⟨C₆H₃(Cl)⟩–O–SO₂–⟨C₆H₄⟩–CH₃ | 4-chloro-4'-nitro-2-tosyloxydiphenyl ether | M.P. 115.5~117.5. |
| XXIII | O₂N–⟨C₆H₄⟩–O–⟨C₆H₃(Cl)⟩–O–SO₂CH₂Cl | 4-chloro-2-(chloromethanesulfonyloxy)-4'-nitrodiphenyl ether. | M.P. 129.5~131.5. |
| XXIV | O₂N–⟨C₆H₄⟩–O–⟨C₆H₃(Cl)⟩–O–P(=S)(OCH₃)(OCH₃) | O,O-dimethyl 5-chloro-2-(4-nitrophenoxy) phenylphosphorothioate. | R.I. $n_D^{18}$=1.5946. |
| XXV | O₂N–⟨C₆H₄⟩–O–⟨C₆H₃(Cl)⟩–O–C(=O)NHCH₃ | 4-chloro-4'-nitro-2-(methylcarbamyl)diphenyl ether | M.P. 129.5~131.5. |
| XXVI | O₂N–⟨C₆H₄⟩–O–⟨C₆H₂(Cl)(Cl)⟩–O–SO₂–⟨C₆H₄⟩–CH₃ | 4,5-dichloro-4'-nitro-2-tosyloxydiphenyl ether | M.P. 160~161. |

TABLE 2—Continued

| No. | Structural formula | Chemical name | Melting point or refractive index |
|---|---|---|---|
| XXVII | $O_2N$-C₆H₄-O-C₆H₂(Cl)(Cl)-O-P(=S)(OCH₃)(OCH₃) | O,O-dimethyl 4,5-dichloro-2-(4-nitrophenoxy)phenyl-phosphorothioate. | M.P. 156~157.5. |
| XXVIII | $O_2N$-C₆H₄-O-C₆H₂(Cl)(Cl)-O-C(=O)-NHCH₃ | 4,5-dichloro-4'-nitro-2-(methylcarbamyl)diphenyl ether | M.P. 120~121.8. |
| XXIX | $O_2N$-C₆H₄-O-C₆H₂(Cl)(Cl)-O-SO₂CH₂Cl | 2-(chloromethanesulfonyloxy)-4,5-dicloro-4'-nitrodiphenyl ether. | M.P. 137~139. |
| XXX | $O_2N$-C₆H₄-O-C₆H₃(Cl)-OH (with Cl on left ring) | 4,2'-dichloro-2-hydroxy-4'-nitrodiphenyl ether | M.P. 100~102. |
| XXXI | $O_2N$-C₆H₃(Cl)-O-C₆H₃(Cl)-OH | 5,2'-dichloro-2-hydroxy-4'-nitrodiphenyl ether | M.P. 116~117. |
| XXXII | $O_2N$-C₆H₃(Cl)-O-C₆H₄-OH | 2-chloro-2'-hydroxy-4-nitrodiphenyl ether | M.P. 62~65. |
| XXXIII | $O_2N$-C₆H₃(Cl)-O-C₆H₃(Cl)-O-C(=O)CH₃ | 2-acetoxy-4,2'-dichloro-4'-nitrodiphenyl ether | R.I. $n_D^{26.5}$=1.5640. |
| XXXIV | $O_2N$-C₆H₃(Cl)-O-C₆H₃(Cl)-O-SO₂-C₆H₄-CH₃ | 4,2'-dichloro-4'-nitro-2-tosyloxydiphenyl ether | M.P. 100~101. |
| XXXV | $O_2N$-C₆H₃(CH₃)-O-C₆H₃(Cl)-OH | 5-chloro-2-hydroxy-2'-methyl-4'-nitrodiphenyl ether | M.P. 81.5~84.5. |
| XXXVI | $O_2N$-C₆H₃(OH)-O-C₆H₃(Cl)-OH | 5-chloro-2,2'-dihydroxy-4'-nitrodiphenyl ether | M.P. 127~128. |

The germicidal and fungicidal agent of this invention can be used for various fields and typical examples of their application are soaps, toiletries, sterilization for hospital use, mold inhibitor for fiber, plastics and paint, disinfection for sanitary goods and fabrics, a sterilizing and deodorant agent for drainage and a slime control agent for pulp industry.

The germicidal and fungicidal agent of this invention also can be used in various forms or formulations and typical examples are a composition which contains at least one of the compounds of this invention or its mixture with other conventional germicides or fungicides, a composition consisting of appropriate carrier and the compound of this invention, and a solution, emulsion or dispersion consisting of a solvent, the compound of this invention and surfactant, if necessary. The favorable contents of the compound in these formulations are from 0.5 to 10,000 p.p.m.

An antiseptic toilet composition can be provided with a mixture containing 0.01–10% by weight of the compound of this invention and synthetic toilet detergent or soap and by adding dye, perfume and other auxiliaries if necessary. They are used in any form of solid, solution emulsion or suspension.

An antiseptic composition for human waste or sewerage can be prepared by dispersing 0.1–10% by weight of the compound of this invention, pigment or dye and appropriate amount of surfactant into suitable dispersing medium, or by mixing 0.1–10% by weight of the compound of this invention, pigment or dye and appropriate carrier, and further adding deodorant, perfume and other auxiliaries if necessary.

A slime control agent particularly suitable for paper industry can be provided by mixing 1–30% by weight of the compound of this invention, appropriate amount of surfactant and medium such as water or organic solvent.

Prevention from propagation of germs or fungi on the plastic can be attained by adding 1–1000 p.p.m. of the compound of this invention to the plastic during polymerization, compound or molding process.

In order to give those skilled in the art a better understanding of the invention, the following illustrative examples are given:

EXAMPLE 1

Preparation of 2-acetoxy-4-chloro-4'-nitrodiphenyl ether (compound III)

5 g. of 4-chloro-2-hydroxy-4'-nitrodiphenyl ether was mixed with 3.1 g. of acetic anhydride and the resulting mixture, to which one drop of pyridine was added, was heated under refluxing for 10 hrs. After completing the reaction, the cooled reaction mixture was poured into ice water, neutralized by aqueous caustic soda and filtered. Dryed filter cake was recrystallized from ligroin and thus 3.1 g. of white crystal of 2-acetoxy-4-chloro-4'-nitro diphenyl ether having 85–87.5° C. of melting point was obtained. (Yield: 50.6%.) A result of elementary analysis is as follows:

| Element | Percent | |
|---|---|---|
|  | Observed | Theoretical |
| C | 54.42 | 54.65 |
| H | 3.47 | 3.28 |
| Cl | 11.03 | 11.52 |
| N | 4.23 | 4.56 |

EXAMPLE 2

Preparation of 5-bromo-4-chloro-2-hydroxy-4'-nitrodiphenyl ether (compound XIX)

4 g. of 4-chloro-2-hydroxy-4'-nitrodiphenyl ether was dissolved in 40 g. of acetic anhydride and 2.4 g. of bromine was gradually added to the solution followed by standing for one night at room temperature. Further, in order to complete the reaction, the solution was warmed at 50° C. for 3 hrs. and the product was neutralized and separated in accordance with the similar manner as in Example 1. Then 2.6 g. of white crystals of 5-bromo-4-chloro-2-hydroxy-4'-nitro diphenyl ether having melting point of 136–138.5° C. was provided after recrystallizing the crude product from chloroform. (Yield 50.4%.) A result of elementary analysis is as follows:

| Element | Percent | |
|---|---|---|
|  | Observed | Theoretical |
| C | 41.81 | 41.83 |
| H | 2.03 | 2.05 |
| Cl | 10.81 | 10.29 |
| N | 3.89 | 4.07 |

EXAMPLE 3

Preparation of disodium 5-chloro-2-(4-nitrophenoxy) phenyl phosphorate (compound XXI)

4-chloro-2-hydroxy-4'-nitrodiphenyl ether (A) was prepared by demethylation of 4-chloro-2-methoxy-4'-nitrodiphenyl ether under existence of hydrobromic acid. 26.6 g. of the compound (A) was mixed with 90 g. of phosphorus oxychloride and 0.5 of sodium chloride, and the resulting mixture was refluxed for 7 hrs. After finishing the reaction, almost all of unreacted phosphorus oxychloride was removed under reduced pressure and 300 ml. of warm water was added to the residue. After a while, an oily matter was separated from a water layer and acidified by adding hydrochloric acid. Then the oily matter was dissolved into an alcoholic mixture consisting of 200 cc., of alcohol, 50 g. of water and 10 g. of caustic soda, and the resulting solution was treated with active carbon. Solvent was removed from the filtrate under reduced pressure and thus, light yellowish crystal of disodium 5-chloro-2-(4-nitrophenoxy)phenyl phosphorate having melting point of 141–142° C. (decompose) was obtained. (Yield: 60%.) A result of elementary analysis is as follows:

| Element | Percent | |
|---|---|---|
|  | Observed | Theoretical |
| C | 36.79 | 36.99 |
| H | 1.85 | 1.81 |
| Cl | 8.89 | 9.10 |
| N | 4.17 | 3.60 |
| P | 7.71 | 7.95 |

EXAMPLE 4

Preparation of 4,5-dichloro-4'-nitro-2-tosyloxy diphenyl ether (compound XXVII)

6.4 g. of sodium 4,5-dichloro-2-(4-nitrophenoxy) phenoxide, which was prepared by reacting sodium ethylate with 4,5-dichloro-2-hydroxy-4'-nitro-diphenyl ether, dissolved into 70 ml. of anhydrous acetone and 3.8 g. of tosyl chloride was added dropwise gradually to the mixture at room temperature with agitation. After additional agitation for 2 hrs. the reaction mixture was poured into ice water so as to solidify. Solid matter was collected by filtration and the cake was washed with water, dryed and recrystallized from acetone. Thus, 3.0 g. of transparent yellowish scaly crystal of 4,5-dichloro-4'-nitro-2-tosyloxydiphenyl ether having 160–161° C. of melting point was obtained. (Yield 30.3%.) A result of elementary analysis is as follows:

| Element | Percent | |
|---|---|---|
|  | Observed | Theoretical |
| C | 50.01 | 50.23 |
| H | 2.90 | 2.88 |
| Cl | 16.02 | 15.61 |
| N | 3.83 | 3.08 |
| S | 6.71 | 7.06 |

EXAMPLE 5

Preparation of methyl[5-chloro-2-(4-nitrophenoxy) phenoxy]-acetate (Compound XV)

13.3 g. of 4-chloro-2-hydroxy-4'-nitro diphenyl ether was added dropwise to an alkolate solution composed of 100 ml. of anhydrous ethanol and 1.15 g. of metallic sodium, 5.43 g. of methyl chloroacetate was added to the mixture and then reflux was continued for 7 hrs. After finishing the reaction, the cooled reaction mixture was filtered and ethanol in the filtrate was removed under reduced pressure. The residue was recrystallized from ethanol and pale grayish crystal of methyl 5-chloro-2-(4-nitrophenoxy)phenoxy acetate having 74–78° C. of melting point was obtained. A result of elementary analysis is as follows:

| Element | Percent | |
|---|---|---|
|  | Observed | Theoretical |
| C | 53.23 | 53.35 |
| H | 3.51 | 3.58 |
| Cl | 10.82 | 10.50 |
| N | 4.61 | 4.15 |

EXAMPLE 6

Preparation of O,O-dimethyl-5-chloro-2-(4-nitrophenoxy)phenyl phosphorothioate (Compound XXIV)

10 g. of 4-chloro-2-hydroxy-4'-nitrodiphenyl ether and 6.2 g. of potassium carbonate was dissolved in 50 ml. of acetone and 16 g. of acetone solution containing 6.6 g. of O,O-dimethyl thiophosphorylchloride was gradually added to the resulting solution. After refluxing for 2.5 hrs., the reaction mixture was poured into 300 ml. of ice water and the product was extracted by benzene. The extract was washed with water and dryed. Then the solvent was distilled under reduced pressure. Pale yellowish oily matter of O,O-dimethyl-5-chloro-2-(4-nitrophenoxy)phenylphosphorothioate having a refractive index of $n_D^{18}$-1.5946 was obtained. A result of elementary analysis is as follows:

| Element | Percent Observed | Percent Theoretical |
|---|---|---|
| C | 43.41 | 43.14 |
| H | 3.24 | 3.36 |
| Cl | 8.98 | 9.10 |
| N | 3.83 | 3.59 |
| P | 8.19 | 7.95 |

EXAMPLE 7

Preparation of 4-chloro-4'-nitro-2-(methylcarbamyl) diphenyl ether (Compound XXV)

20 g. of 4-chloro-2-hydroxy-4'-nitro diphenyl ether was dissolved in 100 ml. of benzene and after dropping 1 drop of pyridine, the mixture consisting of 5.1 g. of methylisocyanate and 5 ml. of benzene was added to the resulting solution with agitation. Following by reflux for 16 hrs., the reaction mixture was concentrated and the residue was recrystallized from ethanol. Thus, slightly yellowish needle crystal of 4-chloro-4'-nitro-2(methylcarbamyl)diphenyl ether having melting point of 101–103° C. was obtained. (Yield: 60%.) A result of elementary analysis is as follows:

| Element | Percent Observed | Percent Theoretical |
|---|---|---|
| C | 52.34 | 52.11 |
| H | 3.48 | 3.44 |
| Cl | 11.31 | 10.99 |
| N | 9.04 | 8.68 |

EXAMPLE 8

Standard solutions were prepared by dissolving 20 mg. of each compound listed in Table 2 into 10 ml. of acetone respectively. A series of culture grounds including various concentration of the compounds of this invention were provided by placing 10 ml. of meat extract solution (test for germs) or Sabouraud solution (test for fungi) in test tubes and by successively adding the above standard solution in such manner that the contents of the compound in the resulting solution were 0.5, 5, 50 and 500 p.p.m. respectively. In case of the test for a bactericidal activity, 0.1 ml. of diluted bacteria solution which was prepared by diluting 18-hour cultuerd fluids of *Escherichia coli* or *Staphylococcus aureus* at the rate of 1:100 was inoculated into each test tube and the cultured fluids were incubated at 37° C. Observation was made at 24 hrs. and 48 hrs. after and then minimum concentration for preventing the propagation of bacteria was investigated.

In case of the test for fungicidal activity, 0.1 ml. of completely cultivated plant diluted with nutrient broth so as to contain a cell count of 10,000 per ml. and was added to every test tube and the cultured fluids were incubated at 27° C.

Observation was made after 2 days and 4 days (in case of *Candida albicans*) or after 5 days and 15 days (in case of *Trichophyton interdigitale*) and then minimum concentrations for preventing the propagation of fungi were investigated.

The results of these tests are set forth in Table 2.

TABLE 2

Minimum concentration of effective range for preventing propagation (p.p.m.)

| Compound No. | Candida albicans 2 days | Candida albicans 4 days | Trichophyton interdigitale 5 days | Trichophyton interdigitale 15 days | Escherichia coli 24 hrs. | Escherichia coli 48 hrs. | Staphylococcus aureus 24 hrs. | Staphylococcus aureus 48 hrs. |
|---|---|---|---|---|---|---|---|---|
| I | 50 | 50 | 0.5 | 0.5 | 0.5 | 0.5 | 0.5 | 0.5 |
| II | 50 | 50 | 5 | 5 | 0.5 | 0.5 | 0.5 | 0.5 |
| III | 50 | 50 | 0.5 | 5 | 0.5 | 0.5 | 0.5 | 0.5 |
| IV | 50 | 50 | 5 | 5 | 0.5 | 0.5 | 0.5 | 0.5 |
| V | 50 | 50 | 5 | 5 | 0.5 | 0.5 | 0.5 | 0.5 |
| VI | 50 | 50 | 5 | 5 | 5 | 5 | 0.5 | 0.5 |
| VII | 50 | 50 | 5 | 5 | 5 | 5 | 0.5 | 0.5 |
| VIII | 50 | 50 | 5 | 5 | 0.5 | 0.5 | 0.5 | 0.5 |
| IX | 50 | 50 | 0.5 | 5 | 0.5 | 0.5 | 0.5 | 0.5 |
| X | 50 | 50 | 5 | 5 | 0.5 | 0.5 | 0.5 | 0.5 |
| XI | 50 | 50 | 5 | 5 | 5 | 5 | 0.5 | 0.5 |
| XII | 50 | 50 | 5 | 5 | 50 | 50 | 0.5 | 0.5 |
| XIII | 50 | 50 | 0.5 | 0.5 | 0.5 | 0.5 | 0.5 | 0.5 |
| XIV | 50 | 50 | 0.5 | 0.5 | 0.5 | 0.5 | 0.5 | 0.5 |
| XV | 50 | 500 | 5 | 5 | 0.5 | 5 | 0.5 | 0.5 |
| XVI | 50 | 50 | 0.5 | 0.5 | 0.5 | 0.5 | 0.5 | 0.5 |
| XVII | 50 | 50 | 5 | 5 | 0.5 | 0.5 | 0.5 | 0.5 |
| XVIII | 50 | 50 | 5 | 5 | 0.5 | 0.5 | 0.5 | 0.5 |
| XIX | 50 | 50 | 5 | 5 | 0.5 | 0.5 | 0.5 | 0.5 |
| XX | 50 | 500 | 0.5 | 5 | 0.5 | 0.5 | 0.5 | 0.5 |
| XXI | 50 | 50 | 5 | 5 | 0.5 | 0.5 | 0.5 | 0.5 |
| XXII | 50 | 50 | 5 | 5 | 0.5 | 0.5 | 0.5 | 0.5 |
| XXIII | 50 | 50 | 5 | 5 | 0.5 | 0.5 | 0.5 | 0.5 |
| XXIV | 50 | 50 | 0.5 | 0.5 | 0.5 | 0.5 | 0.5 | 0.5 |
| XXV | 50 | 50 | 0.5 | 5 | 0.5 | 0.5 | 0.5 | 0.5 |
| XXVI | 50 | 50 | 5 | 5 | 0.5 | 0.5 | 0.5 | 0.5 |
| XXVII | 50 | 50 | 5 | 5 | 0.5 | 0.5 | 0.5 | 0.5 |
| XXVIII | 50 | 50 | 0.5 | 5 | 0.5 | 0.5 | 0.5 | 0.5 |
| XXIX | 50 | 50 | 0.5 | 0.5 | 0.5 | 0.5 | 0.5 | 0.5 |
| XXX | 50 | 500 | 0.5 | 0.5 | 0.5 | 0.5 | 0.5 | 0.5 |
| XXXI | 50 | 500 | 5 | 5 | 0.5 | 0.5 | 0.5 | 0.5 |
| XXXII | 50 | 50 | 5 | 5 | 0.5 | 0.5 | 0.5 | 0.5 |
| XXXIII | 50 | 500 | 5 | 5 | 0.5 | 0.5 | 0.5 | 0.5 |
| XXXIV | 50 | 50 | 0.5 | 0.5 | 0.5 | 0.5 | 0.5 | 0.5 |
| XXXV | 50 | 50 | 5 | 5 | 0.5 | 0.5 | 0.5 | 0.5 |
| XXXVI | 50 | 50 | 0.5 | 5 | 0.5 | 0.5 | 0.5 | 0.5 |
| G-11 [1] | 50 | 500 | | | 50 | 0.5 | 0.5 | 0.5 |
| TMTD [2] | 0.5 | 5 | | | 500 | 5 | 5 | 5 |
| Chloromycetin | | | | | 5 | 5 | | |
| Griseofulvin | | | 5 | 50 | | | | |

[1] G-11: 2,2'-methylene bis(3,4,6-trichlorophenol).
[2] TMTD: bis(N,N-dimethylthiocarbamoyl)disulfide.

EXAMPLE 9

Phenol index of the compounds of this invention were investigated according to the method described in "Saikingaku-Jisshuteiyo" (issued by Denken Gakuyukai) P335.

TABLE 3.—PHENOL INDEX

| Compound No.: | Escherichia coli | Staphylococcus aureus |
|---|---|---|
| I | 450 | 312 |
| II | 114 | 80 |
| III | 227 | 312 |
| IV | 57 | 40 |
| XI | 324 | 264 |
| XII | 238 | 246 |
| XIII | 82 | 51 |
| XIV | 186 | 114 |
| XXI | 440 | 321 |
| XXII | 48 | 212 |
| XXIII | 83 | 318 |
| XXIV | 450 | 308 |
| XXXI | 387 | 220 |
| XXXII | 385 | 335 |
| XXXIII | 131 | 76 |
| XXXIV | 463 | 403 |
| G-11 | 3 | 316 |
| Cyanuric acid chloride | 29 | 20 |

EXAMPLE 10

25 g. of Compound IV were mixed with 100 g. of organic blue pigment, 0.5 g. of deodorant (trade name "Chemicalan" 604 D provided by Soda Koryo Co.) and 825 g. of starch by means of a ball mill and then an antiseptic composition for human waste or sewage was obtained. 9 g. of the composition was added to 500 ml. of aqueous pepton solution which contained $3.2 \times 10^{11}$ cells of *Escherichia coli* per milliliter and agitation was continued for 48 hrs. at room temperature. Completing the above agitation, residual survival cells of *Escherichia coli* in the solution were counted but a surviving rate is almost 0%.

Similar tests were performed with regard to the Compounds I, III, XIII, XXIV, XXVI, XXXII and XXXV, the same results were obtained.

EXAMPLE 11

Suspension of the compound I in 25% aqueous solution of gum arabic was compulsorily fed to six female mice by means of a stomach tube and inspection had been made for 2 weeks. Testing results indicated that LD 50 of the compound was more than 5,000 mg./kg. Further, the Compounds II, IX, XIII, XXX and XXXIII also showed more than 5,000 mg./kg. of LD 50 value by the similar method and consequently were proved that toxicity of these compounds were also low.

EXAMPLE 12

0.1%, 1% and 10% concentration of suspension were prepared by suspending Compounds I, IX, XIII, XV, XXVI and XXVIII into 5% aqueous solution of gum arabic. Then the above suspensions were dropped on rabbits conjunctiva, cornea and skin, and were wiped out after 1 minute. The rabbits were bred for 2 weeks and inflammation was checked. Even in 10% suspension of the compounds, no inflammation was observed.

EXAMPLE 13

Slime control compositions were prepared by mixing 80% of ethylene glycol, 5% of nonionic surfactant (obtained by trade name of Solpole from Toho Kagaku Co.) and 15% of one of Compound I, XIII, XXI, XXII, XXV and XXX respectively. The composition was added to water stream in the paper manufacturing process so as to keep an ingredient concentration of 5 p.p.m. and complete prevention from breeding of microbe was observed.

EXAMPLE 14

Antibiotic soaps were prepared by mixing the Compounds I, III, IX, XIII, XXIII, XXIV, XXIX, XXX and XXXVI with soap at various rate respectively. The test for bacteriocidal activity was performed and the results showed that all of the above compounds have excellent bacteriocidal activity for *Escherichia coli*, *Staphylococcus aureus*, *Trichophyton interdigitale*, *Candida albicans*, *Proteus vulgaris* and *Aerobacter aerogenes*. Further similar test was also performed with respect to the mixture consisting of 0.5% of the above compound, 1.0% of hexachlorophene (G-11) and toilet soap, and identical results were confirmed.

EXAMPLE 15

Antimicrobial fiber was prepared by treating a cotton with aqueous solution containing a sterilizing composition consisting of 20% of the compound of this invention, 40% of polyethylene glycol alkyl phenol ether and 40% of polyethylene glycol in order to contain about 5 p.p.m. of the compound in the cotton. Then germs and fungi used in Example 14 were inoculated on the moistured cotton and inoculated on the moistured cotton and incubated. This test was performed with respect to Compounds I, IX, XXII and XXVII, and excellent effects for prevention from propagation of microbes were confirmed in all compounds.

What is claimed is:

1. As a germicidal and fungicidal agent, a carrier and at least 0.5 p.p.m. of the following compound:

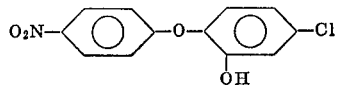

References Cited

UNITED STATES PATENTS

| 3,050,440 | 8/1962 | Richter | 424—340 |
| 3,284,362 | 11/1966 | Zussman | 424—340 |
| 3,420,892 | 1/1969 | Martin et al. | 260—612 |
| 3,506,720 | 4/1970 | Model et al. | 260—613 |

FOREIGN PATENTS

| 136,919 | 12/1929 | Switzerland | 260—613 |
| 1,022,744 | 3/1966 | Great Britain | 424—340 |
| 1,581,400 | 9/1969 | France | 260—613 |

ALBERT T. MEYERS, Primary Examiner
F. E. WADDELL, Assistant Examiner

U.S. Cl. X.R.

252—106, 107; 424—217, 289, 300, 309, 311, 315, 317, 341